US011333524B2

(12) United States Patent
Zhong et al.

(10) Patent No.: US 11,333,524 B2
(45) Date of Patent: May 17, 2022

(54) INFORMATION MANAGEMENT SYSTEM, INFORMATION MANAGEMENT METHOD, AND INFORMATION MANAGEMENT DEVICE

(71) Applicant: Hitachi, Ltd., Tokyo (JP)

(72) Inventors: Ying Zhong, Tokyo (JP); Shuji Soga, Tokyo (JP); Atsuko Bandou, Tokyo (JP); Iwao Tanuma, Tokyo (JP); Satoshi Murata, Tokyo (JP); Shogo Takada, Tokyo (JP); Michiki Nakano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 145 days.

(21) Appl. No.: 16/728,280

(22) Filed: Dec. 27, 2019

(65) Prior Publication Data

US 2020/0309562 A1  Oct. 1, 2020

(30) Foreign Application Priority Data

Mar. 25, 2019 (JP) .............................. JP2019-056880

(51) Int. Cl.
*G01C 21/36* (2006.01)
*B60L 58/10* (2019.01)
(Continued)

(52) U.S. Cl.
CPC .......... *G01C 21/3697* (2013.01); *B60L 53/65* (2019.02); *B60L 58/10* (2019.02);
(Continued)

(58) Field of Classification Search
CPC ................................................ G01C 21/3697
See application file for complete search history.

(56) References Cited

U.S. PATENT DOCUMENTS 8,538,694 B2 * 9/2013 Conway ........... G08G 1/096838
701/533
9,302,594 B2 * 4/2016 Tripathi .................. B60L 53/36
(Continued)

FOREIGN PATENT DOCUMENTS

JP 2012-205461 A 10/2012
JP 2013064686 A 4/2013
(Continued)

OTHER PUBLICATIONS

Extended European Search Report received in Application No. 20151173.0 dated Jul. 17, 2020.
(Continued)

*Primary Examiner* — Jean Paul Cass
(74) *Attorney, Agent, or Firm* — Mattingly & Malur, PC

(57) ABSTRACT

An information management system collects and manages information on a charging stand that allows a user to effectively utilize the time during charging. The information management system acquires, from a probe information management device that stores location information of a vehicle and battery residual capacity information of a battery provided in the vehicle, the location information of the vehicle and the battery residual capacity of the vehicle; and acquires, from a user operation terminal operated by a user who gets on the vehicle, destination information indicating a location of a destination of the vehicle input by the user and information on what the user wants to do during charging of the vehicle. A storage unit stores the location information of the vehicle and the battery residual capacity information in association with the destination information of the vehicle and the information on what the user wants to do during the charging.

11 Claims, 13 Drawing Sheets

(51) Int. Cl.
*B60L 53/65* (2019.01)
*G01C 21/34* (2006.01)
*G06Q 30/02* (2012.01)

(52) U.S. Cl.
CPC ..... *G01C 21/3469* (2013.01); *G01C 21/3682* (2013.01); *G06Q 30/0207* (2013.01)

(56) References Cited

U.S. PATENT DOCUMENTS

| | | | |
|---|---|---|---|
| 9,516,470 B1* | 12/2016 | Scofield | H04W 4/029 |
| 10,396,332 B2* | 8/2019 | Joos | H01M 50/502 |
| 2011/0282724 A1* | 11/2011 | Hwang | G06Q 30/02 |
| | | | 705/14.19 |
| 2011/0288765 A1* | 11/2011 | Conway | G08G 1/096816 |
| | | | 701/533 |
| 2016/0104486 A1* | 4/2016 | Penilla | G10L 15/005 |
| | | | 704/232 |
| 2016/0335377 A1 | 11/2016 | Yamashina et al. | |
| 2017/0046762 A1 | 2/2017 | Arita et al. | |
| 2018/0281612 A1* | 10/2018 | Perry | B60L 53/63 |
| 2019/0217735 A1* | 7/2019 | Donnelly | B60W 20/13 |

FOREIGN PATENT DOCUMENTS

| | | |
|---|---|---|
| JP | 2015163027 A | 9/2015 |
| WO | 2016020997 A1 | 4/2017 |
| WO | 2017154760 A1 | 9/2017 |

OTHER PUBLICATIONS

Communication Pursuant to Article 94(3) EPC received in corresponding European Application No. 20 151 173.0 dated Aug. 31, 2021.

Anonymous, "Elektroauto", Wikipedia, Mar. 14, 2019, pp. 1-69, URL: https://de.wikipedia.org/w/index.php?title=Elektroauto&oldid=186571144.

Anonymous, "Connected Car", Wikipedia, Jan. 1, 2019, pp. 1-10, URL: https://en.wikipedia.org/w/index.php?title=Connected_car&oldid=876312371.

Japanese Office Action received in Japanese Application No. 2019-056880 dated Feb. 1, 2022.

* cited by examiner

FIG. 3

| STORE ID 310 | STORE TYPE 320 | INSTALLATION LOCATION 330 | BUSINESS HOURS 340 | CONGESTION DEGREE 350 | | | | AVAILABLE COUPON 360 | COUPON CONTENT 370 |
|---|---|---|---|---|---|---|---|---|---|
| | | | | ... | 9 O'CLOCK | 10 O'CLOCK | 11 O'CLOCK | | |
| SA0001 | RESTAURANT | (x1, y1) | 6 – 22 | ... | 5% | 10% | 40% | CX0001 | PARKING FOR FREE |
| SA0002 | ENTERTAINMENT | (x2, y2) | 10 – 24 | ... | 0% | 10% | 10% | CX0001 | 5%OFF |
| ... | ... | ... | ... | ... | ... | ... | ... | ... | ... |

| CHARGING STAND ID (410) | CHARGING STAND TYPE (420) | INSTALLATION LOCATION (430) | INSTALLATION STORE (440) |
|---|---|---|---|
| EVS0001 | QUICK CHARGING | $(x_1, y_1)$ | SA0001 |
| EVS0002 | NORMAL CHARGING | $(x_2, y_2)$ | SA0001 |
| ... | ... | ... | ... |

Table 400

FIG. 5

| VEHICLE ID (510) | ACQUISITION TIME (520) | ACQUISITION LOCATION (530) | BATTERY RESIDUAL CAPACITY (540) |
|---|---|---|---|
| EVA0001 | 2019/3/1 15:15:45 | $(x_1, y_1)$ | 25% |
| EVA0002 | 2019/3/1 15:16:45 | $(x_2, y_2)$ | 70% |
| ... | ... | ... | ... |

Table 500

FIG. 6

| USER ID | VEHICLE ID | ROUTE ID | DEPARTURE LOCATION | DESTINATION | SCHEDULED ARRIVAL TIME | DESIRED STORE TYPE (WHAT USER WANTS TO DO DURING CHARGING) | CHARGING TIME | MARK | |
|---|---|---|---|---|---|---|---|---|---|
| | | | | | | | | MARK 1 | MARK 2 |
| UA0001 | EVA0001 | RY0001 | (x₁, y₁) | (x₂, y₂) | 16:35 | RESTAURANT | QUICK | SA0001 | ... |
| UA0002 | EVA0002 | RY0002 | (x₃, y₃) | (x₄, y₄) | 18:35 | ENTERTAINMENT | SLOW | SA0002 | ... |
| ... | ... | ... | ... | ... | ... | ... | ... | ... | ... |

| USER ID | VEHICLE ID | ROUTE ID | PROPOSED CHARGING STAND | | MARK | | STOPPING STORE | DISTRIBUTED COUPON | COUPON USE | DESIRED STORE TYPE (WHAT USER WANTS TO DO DURING CHARGING) | CHARGING TIME | ROUTE SEARCH DATE AND TIME |
|---|---|---|---|---|---|---|---|---|---|---|---|---|
| | | | PROPOSE 1 | ... | MARK 1 | ... | | | | | | |
| UA 0001 | EVA 0001 | RY 0001 | EVS 0001 | | SA 0001 | ... | SA 0001 | CX 0001 | YES | RESTAURANT | NORMAL | 2019/3/1 15:15:45 |
| UA 0001 | EVA 0001 | RY 0011 | EVS 0011 | | SA 0011 | ... | SA 0011 | CX 0001 | YES | RESTAURANT | NORMAL | 2019/2/1 16:18:20 |
| ... | ... | ... | ... | | ... | ... | ... | ... | ... | ... | ... | ... |
| UA 0002 | EVA 0002 | RY 0021 | EVS 0021 | | SA 0021 | ... | SA 0021 | CX 0001 | YES | SHOPPING | NORMAL | 2019/3/2 11:10:15 |
| ... | ... | ... | ... | | ... | ... | ... | ... | ... | ... | ... | ... |

700, 701, 702, 703, 704, 705, 706, 707, 708, 709, 710, 711

FIG. 11
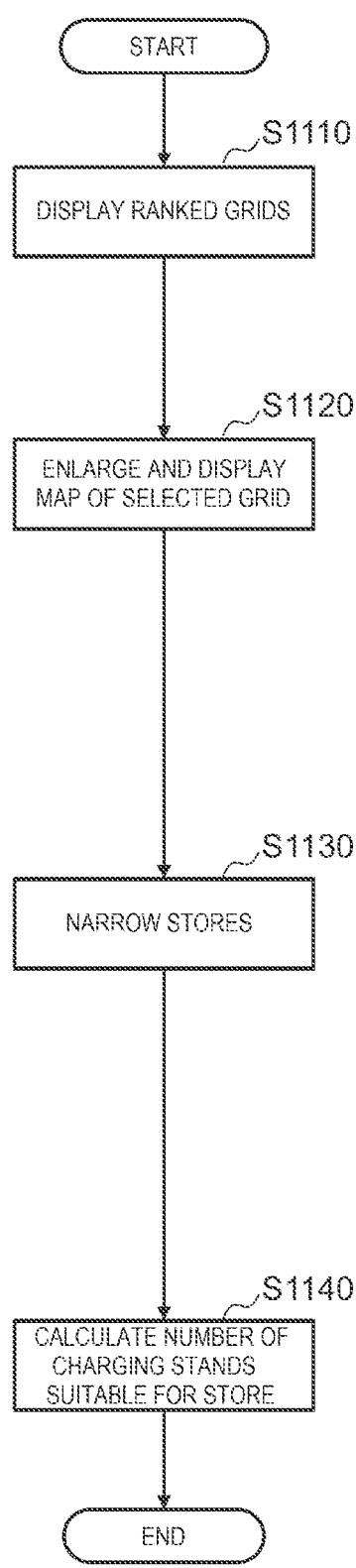
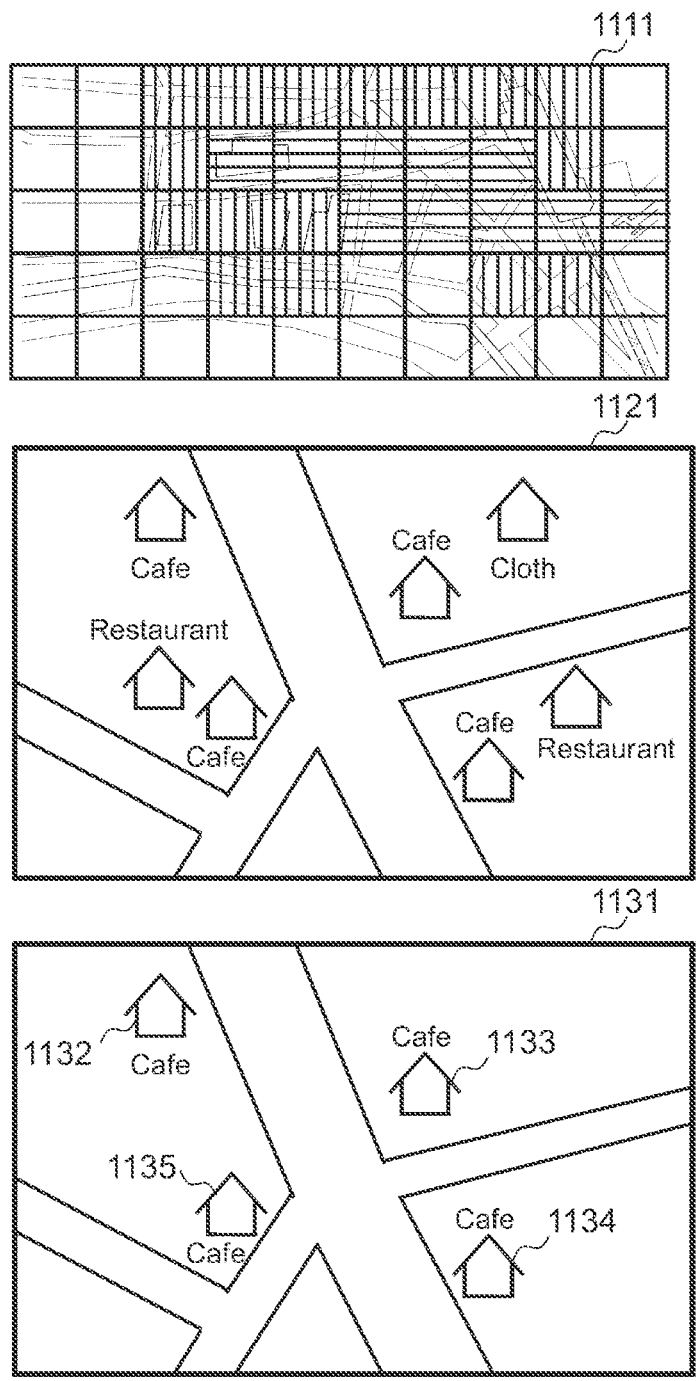

INFORMATION MANAGEMENT SYSTEM, INFORMATION MANAGEMENT METHOD, AND INFORMATION MANAGEMENT DEVICE

CROSS-REFERENCE TO RELATED APPLICATION

The present application claims priority from Japanese application JP 2019-056880, filed on Mar. 25, 2019, the contents of which is hereby incorporated by reference into this application.

BACKGROUND OF THE INVENTION

1. Field of the Invention

The present invention relates to an information management system, an information management method, and an information management device, and is suitably applied to, for example, an information management system that manages information on a vehicle and information on a user.

2. Description of the Related Art

In recent years, the number of electric vehicles (EV) has increased, and there is an increasing need for additional EV charging stands.

Recently, even when charging for driving is planned, a user (EV user) who uses an EV may be confronted with problems that the charging stand is not available, that it takes more time than expected until the charging is completed, or that the time during waiting for charging cannot be effectively utilized.

In this regard, a charging system that is capable of achieving sufficient information presentation effects for using a charging stand is disclosed (see JP-A-2012-205461).

In the technique described in JP-A-2012-205461, advertisement information corresponding to user preference information is presented, but since the advertisement is an announcement activity for selling commodities and for provision of a service, the user cannot effectively utilize the time during waiting for charging.

SUMMARY OF THE INVENTION

The invention has been made in view of the above circumstances, and an object of the invention is to propose an information management system or the like that collects and manages information related to a charging stand, which allows a user to effectively utilize the time during charging.

In order to solve such a problem, in the present invention, there are provided: a first acquisition unit that acquires, from a probe information management device that stores location information indicating a location of a vehicle and battery residual capacity information indicating a battery residual capacity of a battery provided in the vehicle, the location information of the vehicle and the battery residual capacity of the vehicle; a second acquisition unit that acquires, from a user operation terminal operated by a user who gets on the vehicle, destination information indicating a location of a destination of the vehicle input by the user and information on what the user wants to do during charging of the vehicle; and a storage unit that stores the location information of the vehicle and the battery residual capacity information of the vehicle in association with the destination information of the vehicle and the information on what the user wants to do during charging of the vehicle.

According to the configuration described above, the location information of the vehicle and the battery residual capacity information of the vehicle are associated with the destination information of the vehicle and the information on what the user wants to do during charging of the vehicle. Therefore, a store satisfying what the user wants to do during the charging can be proposed, for example, when the user moves from a current location toward the destination and charging is required in a case of determining whether charging by a charging stand is required. With this proposal, the user can effectively utilize the time during the charging.

According to the invention, information related to a vehicle and information related to a user can be managed.

BRIEF DESCRIPTION OF THE DRAWINGS

FIG. 3 is a table illustrating an example of store information according to the first embodiment.

FIG. 4 is a table illustrating an example of charging stand information according to the first embodiment.

FIG. 5 is a table illustrating an example of probe information according to the first embodiment.

FIG. 6 is a table illustrating an example of user information according to the first embodiment.

FIG. 7 is a table illustrating an example of history information according to the first embodiment.

FIG. 11 is a flowchart illustrating an example of a processing of generating information on adjustment of the number of charging stands according to the first embodiment.

DESCRIPTION OF THE PREFERRED EMBODIMENTS

Figure 1:
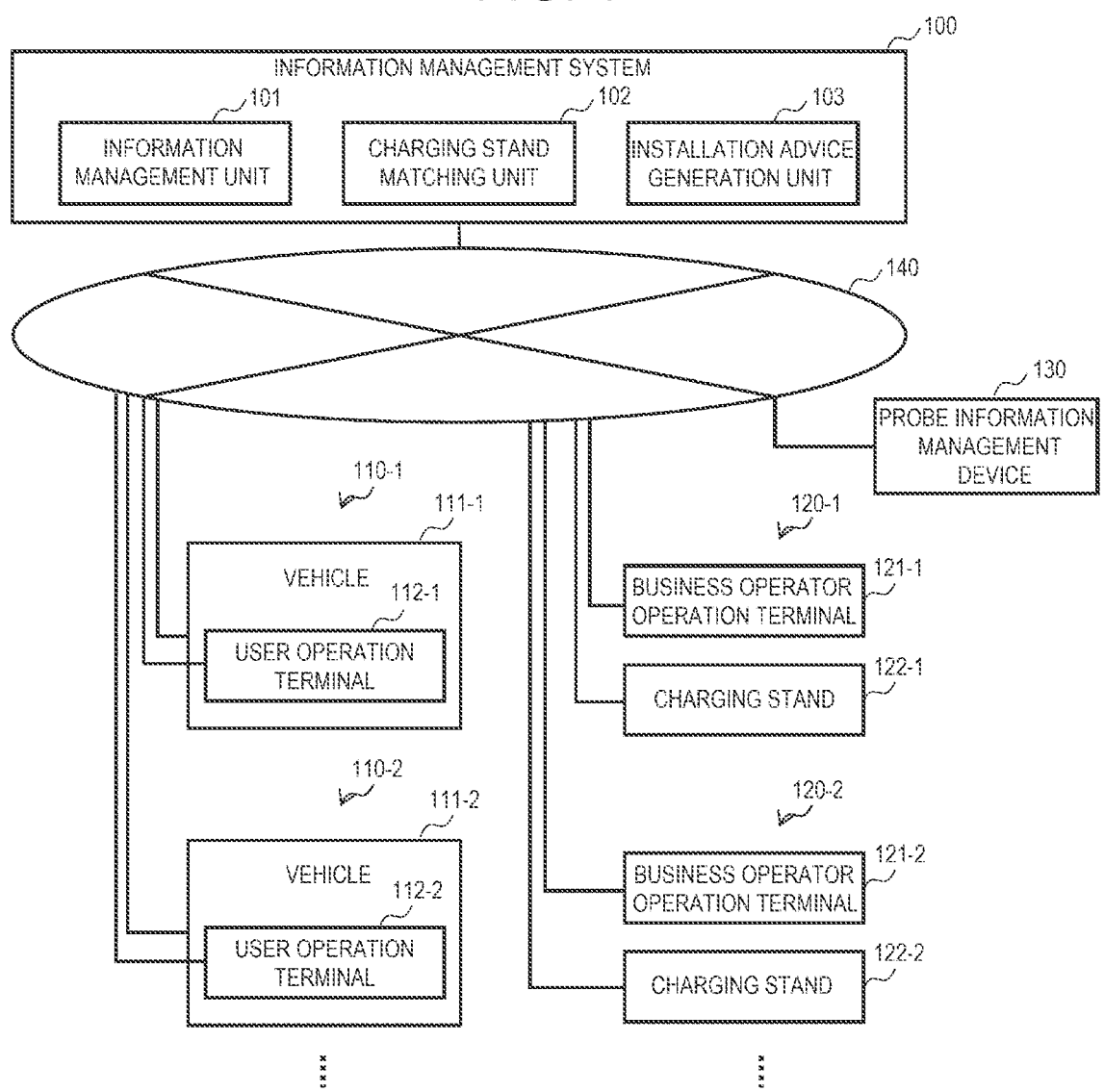
FIG. 1 is a diagram illustrating an example of a configuration of an information management system according to a first embodiment.

Hereinafter, one embodiment of the invention will be described in detail with reference to the drawings.

In the following description, when the same type of elements are described without being distinguished, a common portion (portion other than branch number) of reference numerals including branch numbers may be used, and when the same type of elements are distinguished and described, reference numerals including the branch numbers may be used. For example, when describing the user without particularly distinguishing the user, "user 110" may be described, and when distinguishing and describing individual users, "user 110-1" and "user 110-2" may be described.

(1) First Embodiment

FIG. 1 illustrates an information management system 100 as a whole according to a first embodiment.

The information management system 100 is communicably connected, via a network 140, to a vehicle 111 that a user 110 gets on, a user operation terminal 112 operated by the user 110, a business operator operation terminal 121 operated by a business operator 120 who performs operation and management of a store providing commodities, services or the like to the user 110, a charging stand 122 disposed in the store, and a probe information management device 130 configured to acquire and manage information (probe information) of sensors provided in the vehicle 111.

The vehicle 111 is a plug-in hybrid automobile, an electric vehicle, or the like, and includes a battery (for example, a secondary battery), a residual capacity meter for measuring a residual capacity of the battery, a GPS device for acquiring location information, a communication device for communicating with the outside, and the like. The vehicle 111 transmits, for example, the location information acquired by the GPS device, and residual battery capacity information indicating the residual capacity of the battery measured by the residual capacity meter, to the probe information management device 130 at an appropriate timing in association with identification information (for example, vehicle ID) that makes it possible to identify the vehicle 111. Probe information transmitted to the probe information management device 130 is not limited to the location information of the vehicle 111 or the battery residual capacity information, and may include sensor information acquired by other sensors provided in the vehicle 111, information calculated based on the sensor information, and the like.

The user operation terminal 112 is a user interface device for exchanging information with the user 110. The user operation terminal 112 may be a car navigation system mounted in the vehicle 111, or may be a portable terminal such as a smartphone or a tablet terminal carried by the user 110. For example, the user operation terminal 112 transmits information on a current location (departure location) and information on a destination to the information management system 100 when the destination is input by the user 110, and displays information on a route from the current location transmitted from the information management system 100 to the destination and information on the recommended charging stand 122. Note that the probe information may be used for the information on the current location. The details will be described below with reference to FIGS. 12 to 14.

The business operator operation terminal 121 is a terminal operated by the operator 120. The business operator operation terminal 121 is a tablet terminal, a notebook computer, a personal computer, or the like. The business operator operation terminal 121 transmits store information to the information management system 100 via the network 140, and displays information on the charging stand 122 suitable for the store, as will be described below. Note that the store is a convenience store, a shopping mall, a restaurant, an entertainment facility, or the like, and may be any type and is not limited.

The charging stand 122 is disposed at a parking lot of a store or the like. The charging stand 122 supplies electric power obtained from, for example, a commercial power source of the store to the vehicle 111 via a cable. For example, the charging stand 122 transmits information (for example, information that makes it possible to identify the charged vehicle 111, a charged capacity, a charging time, and a residual battery capacity at the start of charging) indicating that the vehicle 111 is charged to the information management system 100 via the network 140.

The information management system 100 includes an information management unit 101, a charging stand matching unit 102, and an installation advice generation unit 103.

The information management unit 101 collects and stores (manages) information on the charging stand 122 that allows the user 110 to effectively utilize the time during charging. The charging stand matching unit 102 proposes the charging stand 122 that allows the user 110 to effectively utilize the time during charging. The installation advice generation unit 103 calculates and presents the number of charging stands 122 (the number of charging stands) suitable for the store for the business operator 120. Details of the information management unit 101, the charging stand matching unit 102, and the installation advice generation unit 103 will be described below with reference to FIG. 2 and the like.

Figure 2:
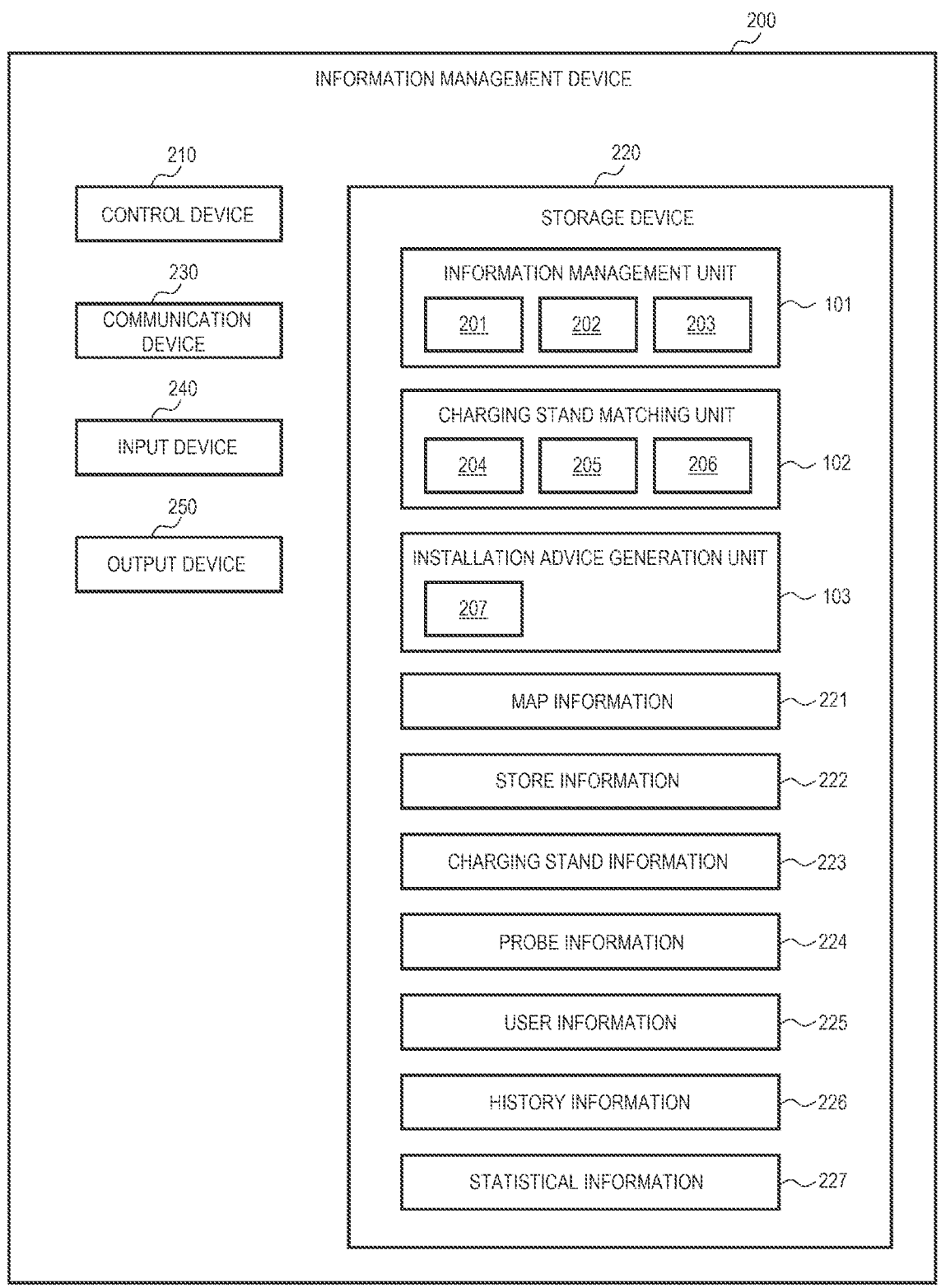
FIG. 2 is a diagram illustrating an example of a configuration of an information management device according to the first embodiment.

FIG. 2 is a diagram illustrating an example of a configuration of an information management device 200 implemented by the information management unit 101, by the charging stand matching unit 102, and by the installation advice generation unit 103.

The information management device 200 includes a control device 210, a storage device 220, a communication device 230, an input device 240, and an output device 250.

The control device 210 is, for example, a central processing unit (CPU), and performs various types of processings. The storage device 220 is a random access memory (RAM), a read only memory (ROM), a hard disk drive (HDD), or the like, and stores various types of information. The communication device 230 is, for example, a network interface card (NIC), and communicates with various devices. The input device 240 is a keyboard, a pointing device, a microphone, or the like, through which various types of information is input. The output device 250 is a display, a speaker, or the like, through which various types of information is output.

Functions of the information management device 200 (the information management unit 101, the charging stand matching unit 102, the installation advice generation unit 103, and the like) may be implemented by, for example, the CPU reading a program stored in the ROM into the RAM and executing the program (software), may be implemented by hardware such as a dedicated circuit, or may be implemented by combining the software and the hardware.

A part of the functions of the information management device 200 may be implemented by another computer capable of communicating with the information management device 200. For example, the information management unit 101, the charging stand matching unit 102 and the installation advice generation unit 103 (processing units) may be implemented by different computers respectively. Further, for example, any one of the processing units may be implemented by another computer. In other words, a part of the processings of the information management unit 101 may be performed by another processing unit, or processings of the charging stand matching unit 102 and the installation advice generation unit 103 may be performed by another processing unit similarly.

The information management unit 101 includes a first acquisition unit 201, a second acquisition unit 202, and a storage unit 203. The first acquisition unit 201 acquires, from the probe information management device 130, for example, the location information of the vehicle 111 and the residual battery capacity of the vehicle 111. The second acquisition unit 202 acquires, from the user operation terminal 112, for example, destination information indicating the location of the destination of the vehicle 111 input by the user 110, and information (for example, type information indicating a type of a store at which the user desires to stop) on what the user 110 wants to do during changing of the vehicle 111. Note that the type of the store is tagged (linked) to what the user 110 wants to do during the changing. The storage unit 203 stores, for example, the location information of the vehicle 111 and the battery residual capacity information of the vehicle 111 in association with the destination information of the vehicle 111 and the information on what the user 110 wants to do during the changing.

The charging stand matching unit 102 includes a selection unit 204, a generation unit 205, and a determination unit 206. The selection unit 204 selects a store satisfying what the user 110 wants to do during the changing, and transmits information on the selected store to the user operation terminal 112. The generation unit 205 generates, for example, a route including the departure location of the vehicle 111, the destination of the vehicle 111 and the store designated by the user 110 among the selected store selected by the selection unit 204 as a stopping location. The determination unit 206 determines, for example, whether a scheduled time (scheduled arrival time) of arriving at the destination of the vehicle 111 is later than a predetermined time.

The installation advice generation unit 103 includes a calculation unit 207. The calculation unit 207 calculates, for example, the number of charging stands suitable for the store based on the statistical information to be described below.

The storage device 220 stores map information 221, store information 222, charging stand information 223, probe information 224, user information 225, history information 226, and statistical information 227.

The map information 221 is map data including road information. For example, the map information 221 includes road shape data and location data. Note that map information used in an existing car navigation system can be appropriately adopted as the map information 221.

The store information 222 is information on a store, such as a location and business hours of the store. The store information 222 may be collected from the business operator operation terminal 121 or may be registered by an administrator. Details of the store information 222 will be described below with reference to FIG. 3.

The charging stand information 223 is information on the charging stand 122, such as a type (quick charger/normal charger) or a location of the charging stand 122. The charging stand information 223 may be collected from the business operator operation terminal 121, collected from the charging stand 122, or may be registered by the administrator. Details of the charging stand information 223 will be described below with reference to FIG. 4.

The probe information 224 is information acquired by a sensor provided in the vehicle 111, such as a location (position) of the vehicle 111 and the residual battery capacity. The probe information 224 is transmitted from the vehicle 111 to the probe information management device 130 at an appropriate timing, or is acquired from the probe information management device 130 as required. Details of the probe information 224 will be described below with reference to FIG. 5.

The user information 225 is information on an input of the user 110, such as the destination or what the user 110 wants to do during the charging. The user information 225 is updated according to the input of the user 110. For example, when input is performed by the user 110, the user operation terminal 112 transmits the input information to the information management unit 101, and the information management unit 101 updates the user information 225. Details of the user information 225 will be described below with reference to FIG. 6.

The history information 226 is information indicating a history of behaviors of the user 110 (the vehicle 111), such as a store at which the user 110 has stopped, a coupon used by the user 110, and a stay time. For example, in the history information 226, one record is generated for one route actually traveled by the user 110. Details of the history information 226 will be described below with reference to FIG. 7.

The statistical information 227 is information indicating statistics of the vehicle 111, such as the number of vehicles related to a store (for example, the number of vehicles to stop at the store). The statistical information 227 is, for example, used to calculate the number of charging stands 122 suitable for the store. Details of the statistical information 227 will be described below with reference to FIG. 8.

The information stored in the storage device 220 is not limited to the information described above. For example, route information indicating a searched route may be stored.

FIG. 3 is a table illustrating an example (store information table 300) of the store information 222.

In the store information table 300, information of a store ID 310, a store type 320, an installation location 330, business hours 340, a congestion degree 350, an available coupon 360, and a coupon content 370 is stored in association with each other.

In the store ID 310, an ID (identification: for example, store ID) that makes it possible to identify a store is stored. In the store type 320, information indicating a type of the store ("restaurant", "entertainment", "shopping", and the like) is stored. In the installation location 330, information (location information) indicating a location of the store is stored. The location information (position information) according to the present embodiment may be latitude and longitude, or may be coordinates on a map. In other words, the location information is not limited to two-dimensional information, and may be three-dimensional information including information on a height direction.

In the business hours 340, information indicating business hours of the store is stored. In the congestion degree 350, information indicating congestion degrees of the store in time periods. The congestion degree of the store is, for example, a value (for example, a percentage) obtained by dividing the number of users in the time period by the number of users in one day. In the available coupon 360, an ID (for example, a coupon ID) that makes it possible to identify one or more coupons available in the store is stored. In the coupon content 370, information indicating the content of the coupon is stored.

Although the example of the store information 222 is illustrated in FIG. 3, the store information 222 is not limited to the contents illustrated in FIG. 3. For example, the store information 222 may include information such as an image (a photograph showing an appearance, an interior, and the like) of the store, a menu and prices.

FIG. 4 is a table illustrating an example (charging stand table 400) of the charging stand information 223.

In the charging stand table 400, information of a charging stand ID 410, a charging stand type 420, an installation location 430, and an installation store 440 is stored in association with each other.

In the charging stand ID 410, an ID (charging stand ID) that makes it possible to identify the charging stand 122 is stored. In the charging stand type 420, information indicating a type of the charging stand 122 ("quick charging", "normal charging", and the like) is stored. In the installation location 430, information (location information) indicating a location of the charging stand 122 is stored. In the installation store 440, information (for example, a store ID) that makes it possible to identify a store where the charging stand 122 is installed is stored.

FIG. 5 is a table illustrating an example (probe table 500) of the probe information 224.

In the probe table 500, information of a vehicle ID 510, an acquisition time 520, an acquisition location 530, and a battery residual capacity 540 is stored in association with each other.

In the vehicle ID 510, an ID (for example, a vehicle ID) that makes it possible to identify the vehicle 111 is stored. In the acquisition time 520, information (time information) indicating time at which a battery residual capacity of the vehicle 111 is acquired is stored. In the acquisition location 530, information (location information) indicating a location where the battery residual capacity of the vehicle 111 is acquired is stored. In the battery residual capacity 540, information (for example, a percentage) indicating the battery residual capacity of the vehicle 111 is stored.

One record may be provided for each vehicle 111, and updated when the probe information is acquired (latest data is stored), or a record may be added each time the probe information is acquired (all acquired data is stored).

Although the example of the probe information 224 is illustrated in FIG. 5, the probe information 224 is not limited to the contents illustrated in FIG. 5. For example, the probe information 224 may include information such as average fuel consumption and a drivable distance.

FIG. 6 is a table illustrating an example (user table 600) of the user information 225.

In the user table 600, information of a user ID 610, a vehicle ID 620, a route ID 630, a departure location 640, a destination 650, a scheduled arrival time 660, a desired store type 670, a charging time 680, and a mark 690 is stored in association with each other.

In the user ID 610, an ID that makes it possible to identify the user 110 is stored. In the vehicle ID 620, an ID (for example, a vehicle ID) that makes it possible to identify the vehicle 111 used by the user 110 is stored. In the route ID 630, an ID (route ID) that makes it possible to identify a route used by the user 110 is stored. In the departure location 640, information (location information) indicating a departure location of the vehicle 111 is stored. In the present embodiment, a location of the vehicle 111 at the time when the user 110 searches for a route will be described as an example of the departure location.

In the destination 650, information (location information) indicating a destination (for example, an address, a telephone number, and a store name) input by the user 110 at the time of searching for a route is stored. In the user table 600, the destination input by the user 110 may be stored. In the scheduled arrival time 660, information indicating a scheduled time of arriving at the destination is stored.

In the desired store type 670, information (store types such as "restaurant" and "entertainment") indicating a type (desired store type) of the store associated with what the user 110 wants to do during the charging (for example, "I want to relax" or "I want to have a meal"). In the user table 600, the information indicating what the user wants to do during the charging input by the user 110 may be stored. In the charging time 680, information that makes it possible to specify a type of the charging stand 122 desired by the user 110 (such as "quick" and "slow") is stored. In the mark 690, identification information (for example, a charging stand ID) that makes it possible to identify the charging stand 122, to which a mark is attached by the user 110, is stored.

FIG. 7 is a table illustrating an example (history table 700) of the history information 226.

In the history table 700, information of a user ID 701, a vehicle ID 702, a route ID 703, a proposed charging stand 704, a mark 705, a stopping store 706, a distributed coupon 707, coupon use 708, a desired store type 709, a charging time 710 and a route search date and time 711 is stored in association with each other.

In the user ID 701, an ID (for example, a user ID) that makes it possible to identify the user 110 is stored. In the vehicle ID 702, an ID (for example, a vehicle ID) that makes it possible to identify the vehicle 111 used by the user 110 is stored. In the route ID 703, an ID (for example, a route ID) that makes it possible to identify a route used by the user 110 is stored.

In the proposed charging stand 704, identification information (for example, a charging stand ID) that makes it possible to identify the charging stand 122 proposed to the user 110 is stored. In the mark 705, identification information (for example, a store ID) that makes it possible to identify a store to which a mark is attached is stored. In the stopping store 706, identification information (for example, a store ID) that makes it possible to identify a store at which the user 110 has stopped is stored. In the distributed coupon 707, identification information (for example, a coupon ID) that makes it possible to identify a coupon distributed to the user 110 is stored. In the coupon use 708, information indicating whether the user 110 has used the distributed coupon (for example, "YES" or "NO") is stored.

In the desired store type 709, information (store types of "restaurant", "entertainment", and the like) indicating a type (desired store type) of the store associated with what the user 110 wants to do during the charging is stored. In the history table 700, the information indicating what the user 110 wants to do during the charging may be stored. In the charging time 710, information that makes it possible to specify a type of the charging stand 122 desired by the user 110 (such as "quick" and "slow") is stored. In the route search date and time 711, information (time information) indicating a time at which the user 110 searches for a route is stored.

Figure 8:
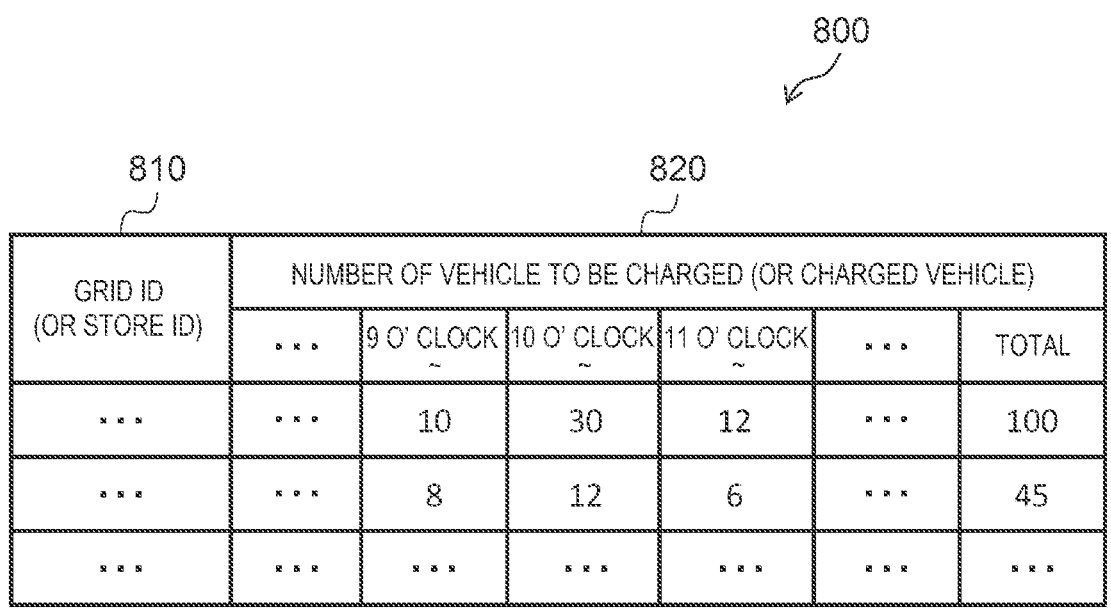
FIG. 8 is a table illustrating an example of statistical information according to the first embodiment.

FIG. 8 is a table illustrating an example (statistical table 800) of the statistical information 227.

In the statistical table 800, information indicating the number of vehicles 111 passing through a grid that is one region (area) obtained by dividing a map into grids, or information indicating the number of vehicles 111 having used the charging stand 122 of a store is stored.

First, a statistical table 800-1 in a case where the information indicating the number of vehicles 111 passing through a grid is stored will be described.

In the statistical table 800-1, information on a grid ID 810-1 and on a vehicle to be charged 820-1 is stored in association with each other.

In the grid ID 810-1, an ID (for example, a grid ID) that makes it possible to identify a grid is stored. In the vehicle to be charged 820-1, information indicating the number of vehicles 111 having a battery residual capacity less than or equal to a predetermined value (for example, 30%), among the vehicles 111 passing through an area identified with the grid ID in one day, is stored. Note that contents of the statistical table 800-1 are not limited to the contents described above. For example, in the statistical table 800-1, rank information (for example, "A" indicating that the charging stand 122 is badly in shortage, "B" indicating that the charging stand 122 is slightly in shortage, and "C" indicating that the charging stand 122 is not in shortage) indicating a degree of shortage of the charging stand 122 may be stored.

Next, a statistical table 800-2 in a case where the information indicating the number of vehicles 111 having used the charging stand 122 of the store is stored will be described.

In the statistical table 800-2, information on a store ID 810-2 and on a charged vehicle 820-2 is stored in association with each other.

In the store ID 810-2, an ID (for example, a store ID) that makes it possible to identify a store is stored. In the charged vehicle 820-2, information indicating the number of vehicles 111 having used the charging stand 122 installed in the store identified with the store ID 810-2 is stored.

A value stored in the vehicle to be charged 820-1 and a value stored in the charged vehicle 820-2 may be a representative value such as an average value or a median value, or may be a value on a specific day (for example, each day of the week, each weekday or each holiday, or a latest day).

Next, a series of processings of the information management system 100 will be described.

Figure 9:
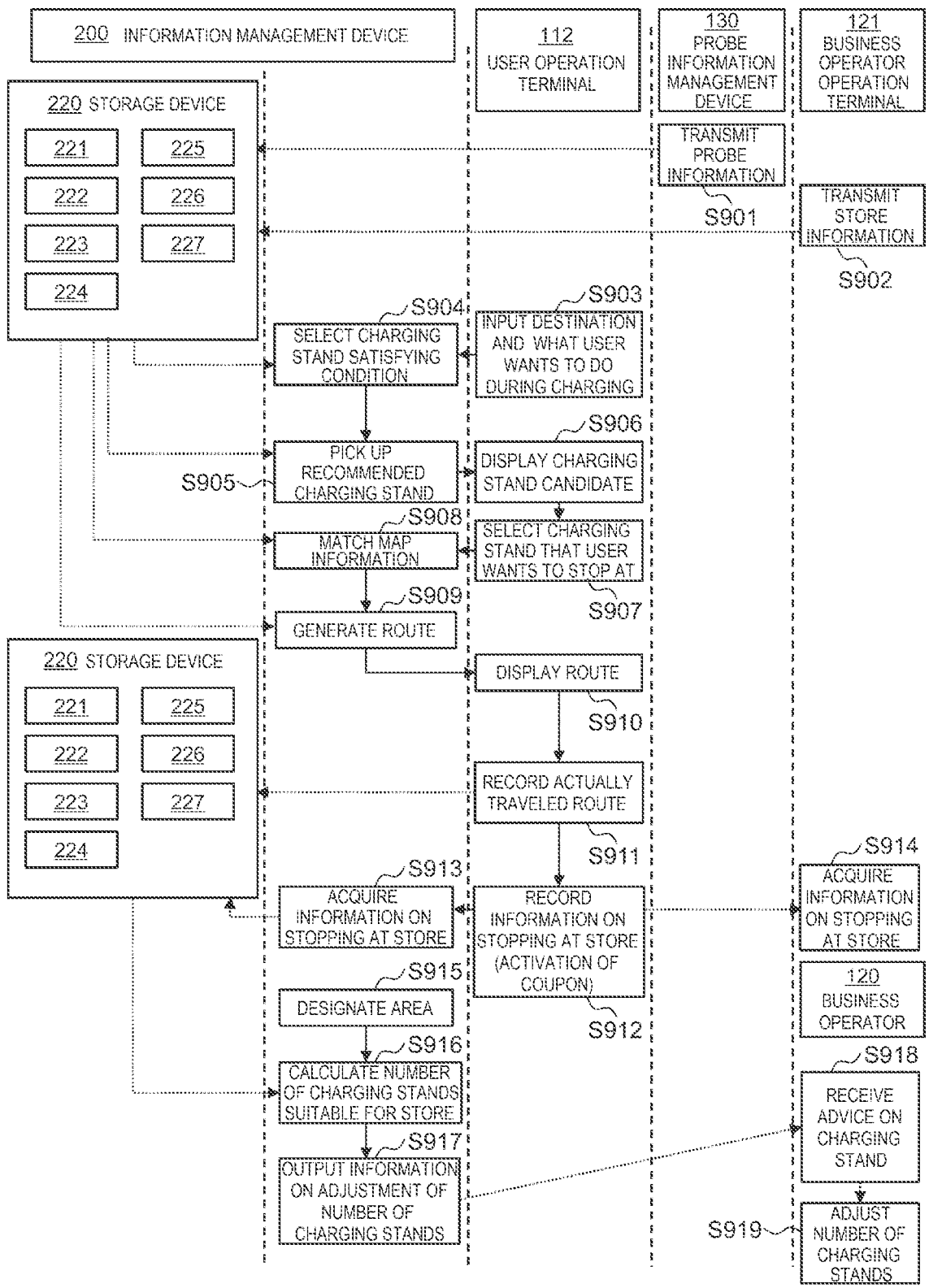
FIG. 9 is a flowchart illustrating a processing of the information management device according to the first embodiment.

FIG. 9 is a flowchart illustrating a processing of the information management device 200.

In step S901, the probe information management device 130 transmits probe information to the information management device 200 in response to a request from the information management device 200. For example, when a vehicle ID of a target vehicle 111 that searches for a route is received from the information management device 200, the probe information management device 130 transmits the probe information corresponding to the vehicle ID to the information management device 200.

A timing at which the probe information management device 130 transmits the probe information is not limited to a timing described above. For example, the probe information management device 130 may transmit the probe information to the information management device 200 periodically (for example, every minute) during a period (for example, while the user 110 is using the vehicle 111, or while the power source of the vehicle 111 is on) designated by the information management device 200.

When receiving the probe information transmitted from the probe information management device 130, the information management device 200 stores the probe information as the probe information 224.

In step S902, when receiving store information input by the business operator 120, the business operator operation terminal 121 transmits the input store information to the information management device 200. A timing at which the store information is transmitted is not limited to a timing at which the store information is input. For example, the timing may be a timing at which there is a request from the information management device 200, or may be another timing. The store information may be manually registered in the information management device 200 by an administrator, the business operator 120, or the like.

When receiving the store information transmitted from the business operator operation terminal 121, the information management device 200 stores the store information as the store information 222.

In step S903, when receiving an input of a destination or a destination and what the user wants to do during charging (desired store type), the user operation terminal 112 transmits the input information together with a user ID and a vehicle ID to the information management device 200 as a search request. A screen for inputting what the user wants to do during the charging will be described below with reference to FIG. 12.

Note that, in step S903, what the user wants to do during the charging may not be input. In a case where what the user wants to do during the charging is not input, the user operation terminal 112 may transmit, to the information management device 200, information indicating that what the user wants to do during the charging is not input, or may not transmit information on what the user wants to do during the charging to the information management device 200.

In step S904, the information management device 200 selects the charging stand 122 satisfying a predetermined condition, based on information stored in the storage device 220 and information received from the user operation terminal 112. Such a processing will be described below with reference to FIG. 10.

In step S905, the information management device 200 picks up the recommended charging stand 122. For example, the information management device 200 refers to the history information 226 and sorts stores in an order of popularity (for example, in a descending order of the number of stopping). The information management device 200 transmits information (an image of the store, the charging time, contents of a coupon, and the like) on the picked-up recommended charging stand 122 to the user operation terminal 112.

In step S906, the user operation terminal 112 displays the information on the received recommended charging stand 122 (charging stand candidate).

In step S907, the user operation terminal 112 receives an input of the charging stand 122 (store) at which the user wants to stop. For example, the user operation terminal 112 transmits a charging stand ID of the selected charging stand 122 to the information management device 200. A screen for inputting (selecting) the charging stand 122 at which the user wants to stop will be described below with reference to FIG. 13.

In step S908, the information management device 200 identifies a location of the selected charging stand 122 by using the charging stand information 223, and associates (matches) the identified location of the charging stand 122 with the map information 221.

In step S909, the information management device 200 generates a route using a current location of the vehicle 111 as a departure location, a destination location input by the user 110 as a destination, and a location of the charging stand 122 selected by the user 110 as a transit location. For example, the information management device 200 transmits map information indicating the generated route together with a route ID to the user operation terminal 112. Note that an existing technique such as Dijkstra's algorithm is used for the search of the route.

In step S910, the user operation terminal 112 displays the route. A screen for selecting the displayed route will be described below with reference to FIG. 14.

In step S911, the user operation terminal 112 records an actually traveled route and transmits the recorded information to the information management device 200.

The information management device 200 receives information on the actually traveled route and a route ID of a selected route, which are transmitted from the user operation terminal 112, and stores the information on the actually traveled route and the route ID as the history information 226.

In step S912, the user operation terminal 112 records information on stopping at a store (for example, a store ID of the stopping store, and a coupon ID of a coupon used in the store), and transmits the information on stopping at the store, together with the user ID and the route ID, to the information management device 200 and the business operator operation terminal 121. Whether the user has stopped at the store, for example, may be determined based on a fact whether a distributed coupon is used (activation of a coupon), may be determined based on a usage history of the charging stand 122, or may be determined based on location information of the vehicle 111.

In step S913, when receiving the information on stopping at the store, the information management device 200 registers the information on stopping at the store as the history information 226 identified by both the user ID and the route ID.

In step S914, when receiving the information on stopping at the store, the business operator operation terminal 121 stores the received information on stopping at the store into a storage device (not shown).

In step S915, the information management device 200 receives an input (designation) of an area where a proprietor who proposes installation of the charging stand 122 conducts business.

In step S916, the information management device 200 uses the statistical information 227 to calculate the number of charging stands 122 suitable for stores in the area designated by the proprietor. Such a processing will be described below with reference to FIG. 11.

In step S917, the information management device 200 outputs (for example, displays) information on adjustment of the calculated number of charging stands 122 to the output device 250. The information management device 200 may transmit the information to the business operator operation terminal 121 of the business operator 120 with which the proprietor conducts business, or may transmit the information to a portable terminal carried by the proprietor.

In step S918, the business operator 120 receives an advice about the number of the charging stands 122 to be installed in the store.

In step S919, the business operator 120 adjusts the number of the charging stands 122 based on the advice.

Figure 10:
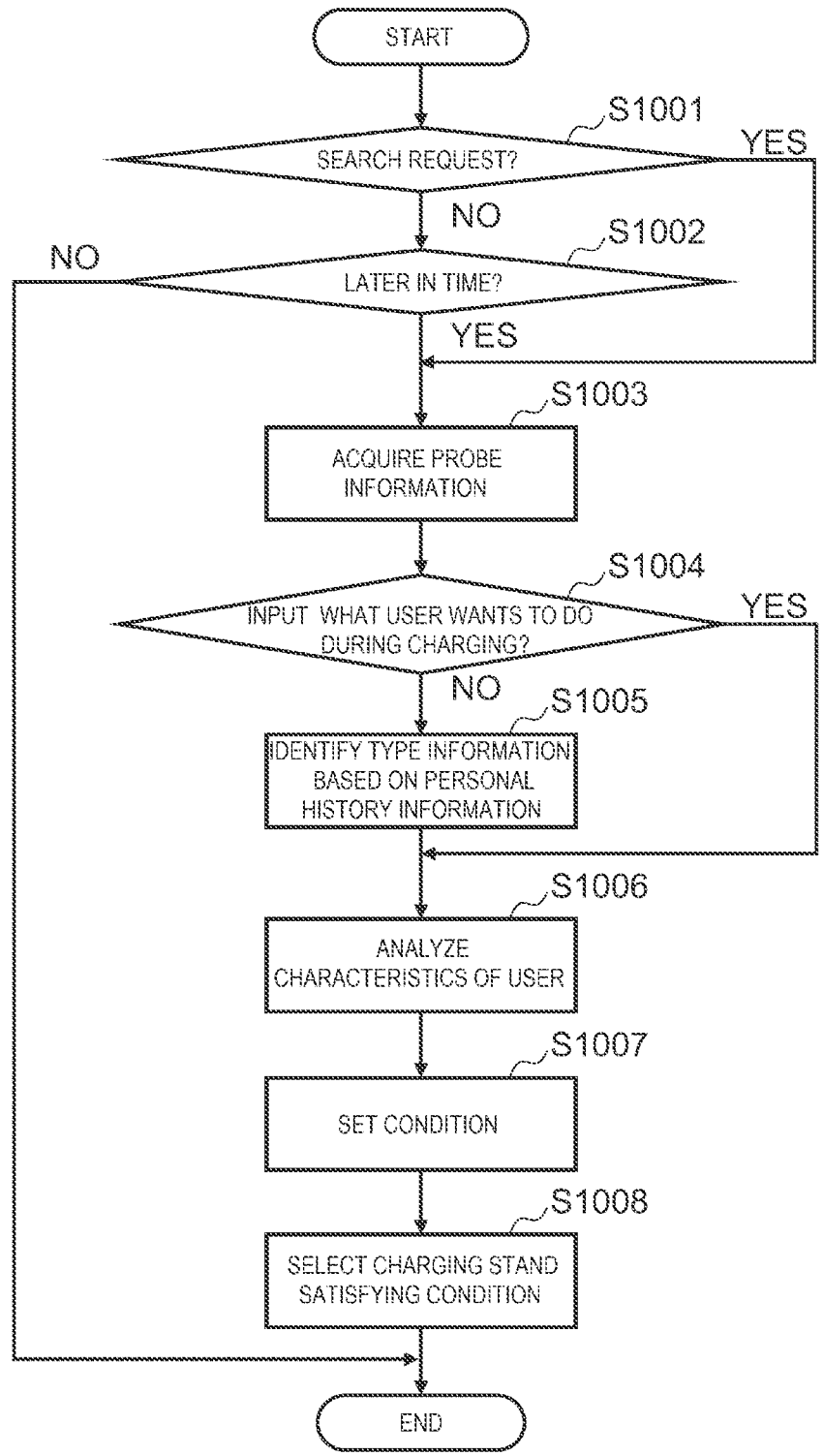
FIG. 10 is a flowchart illustrating an example of a processing of selecting a charging stand satisfying a condition according to the first embodiment.

FIG. 10 is a flowchart illustrating an example of a processing (step S904) of selecting a charging stand satisfying a condition.

In step S1001, the information management device 200 determines whether a route search request is received. When the information management device 200 determines that a route search request is received, the processing proceeds to step S1003, and when the information management device 200 determines that no route search request is received, the processing proceeds to step S1002.

In step S1002, the information management device 200 refers to the user information 225 and determines whether the scheduled time (scheduled rival time) of arriving at the destination of the vehicle 111 is later than a predetermined time. When the information management device 200 determines that the scheduled time of arriving at the destination of the vehicle 111 is later than the predetermined time, the processing proceeds to step S1003, and when the information management device 200 determines that the scheduled time of arriving at the destination of the vehicle 111 is not later than the predetermined time, the processing ends.

In step S1003, the information management device 200 acquires the probe information from the probe information management device 130. With such a processing, the information management device 200 acquires the latest probe information (current location information of the vehicle 111, current battery residual capacity information of the vehicle 111, and the like).

In step S1004, the information management device 200 determines whether there is an input of information indicating what the user wants to do during the charging. When the information management device 200 determines that there is an input, the information management device 200 identifies a type (type information) of a store corresponding to what the user wants to do during the charging, and the processing proceeds to step S1006. On the other hand, when the information management device 200 determines that there is no input, the processing proceeds to step S1005.

In step S1005, the information management device 200 identifies the type information based on the personal history information 226. For example, the information management device 200 refers to the personal history information 226 and the store information 222, and identifies a store type (type information) of a store at which the user has stopped for the most times. In such a processing, a personal preference is estimated based on a tendency for a stopping store. When there is no personal history information 226, default type information may be set, or the type information may not be set.

In step S1006, the information management device 200 analyzes characteristics of the user 110. For example, the information management device 200 refers to the history information 226, and detects, based on route information of routes used in the past, that an expressway is to be used when the route is equal to or longer than a predetermined distance (for example, 30 km) and a general road is to be used when the route is shorter than the predetermined distance. For another example, the information management device 200 refers to the history information 226, and detects (a predetermined capacity) that the charging stand 122 is to be used when a battery residual capacity of the vehicle 111 is less than or equal to a predetermined capacity (for example, 20%).

In step S1007, the information management device 200 sets a condition. For example, the information management device 200 sets location information, destination information, and battery residual capacity information of the vehicle 111 as the condition. The information management device 200 may set the predetermined distance, the predetermined capacity, and the like that are analyzed in step S1006 as the condition.

In step S1008, the information management device 200 selects the charging stand 122 satisfying the condition. For example, according to the vehicle ID, the information management device 200 identifies a current location (departure location) and a battery residual capacity of the vehicle 111 based on the probe information 224, refers to the store information 222, and selects a store that can be arrived at from the departure location. At this time, the information management device 200 calculates, for example, a range that the vehicle can arrive at from the departure location by using a travelable distance (drivable distance), based on the current battery residual capacity and average fuel consumption. The probe information 224 may include the average fuel consumption, or the probe information 224 may include the drivable distance. Further, when information (type information) on what the user wants to do during the charging can be identified, the information management device 200 further selects a store satisfying what the user wants to do during the charging (for example, a store matching the type information).

In other words, in a case where the condition includes the predetermined distance, the information management device 200 selects a store along a general road when a distance from the departure location to the destination is shorter than the predetermined distance, and selects a store (in a service area and the like) along an expressway when the distance is longer than the predetermined distance. For another example, when the condition includes the predetermined capacity, the information management device 200 selects a store in the vicinity of a location where the predetermined capacity is reached.

FIG. 11 is a flowchart illustrating an example of a processing (step S916) of generating information on adjustment of the number of charging stands 122.

In step S1110, the information management device 200 ranks grids, and displays the ranked grids. For example, the information management device 200 refers to the charging stand information 223 and the statistical information 227, and calculates the required number of charging stands 122 based on the number of the existing charging stands 122. More specifically, when there is a time period in which the charging stand 122 is in shortage with the existing charging stands 122 being fully operated, among time periods, the information management device 200 calculates the number of charging stands 122 in shortage in a time period in which the charging stand 122 is most in shortage, as the required number of charging stands 122.

Subsequently, the information management device 200 allocates a rank to each grid according to the number of the charging stands 122 in shortage. For example, a first rank "A" is given when the number of the charging stands 122 in shortage is greater than a first number, a second rank "B" is given when the number of the charging stands 122 in shortage is equal to or greater than a second number and less than the first number, and a third rand "C" is given when the number of the charging stands 122 in shortage is less than the second number. The information management device 200 may store the allocated ranks in the statistical information 227.

Subsequently, the information management device 200 classifies the grids by color according to levels thereof. For example, the information management device 200 sets a red color for the first rank, a yellow color for the second rank, and a green color for the third rank.

Subsequently, the information management device 200 superimposes the grids on a map and displays the map on the output device 250. A screen to be displayed is, for example, a screen 1111. At this time, one or more grids in an area where the proprietor wants to conduct business are selected by the proprietor.

According to the screen 1111, the proprietor can easily grasp an area where the charging stand 122 is in shortage, and efficiently select an area to conduct business.

In step S1120, the information management device 200 enlarges and displays the map of a selected grid. A screen in which the grid is enlarged and displayed is, for example, a screen 1121.

In step S1130, the information management device 200 narrows stores. For example, the information management device 200 narrows the stores according to a predetermined condition. The predetermined condition may be, for example, a type of a store input by the proprietor, or a degree of popularity of the store. Hereinafter, a case where the type of the store and the degree of popularity of the store are used as the predetermined condition will be described.

Here, the degree of popularity of the store may be, for example, a numerical value obtained by taking the number of user reviews and comments of the store into consideration, or may be the number of visitors in one day, or may be another value. In this example, four high-ranking stores having a high degree of popularity of the store are picked out. A screen to be displayed is, for example, a screen 1131. A popularity ratio obtained by dividing the degree of popularity of each store by a sum of the degrees of popularity is described assuming that a cafe 1132 is "0.4", a cafe 1133 is "0.3", a cafe 1134 is "0.2", and a cafe 1135 is "0.1".

In step S1140, the information management device 200 refers to the store information 222, the statistical information 227, and the like, and calculates the number of charging stands 122 suitable for each store. For example, the information management device 200 calculates the number of charging stands 122 corresponding to congestion of each store at a peak time. More specifically, the information management device 200 refers to the store information 222 of each store and acquires a congestion degree in a peak time period. In this example, it is assumed that the number of vehicles 111 having a battery residual capacity of 30% or less and passing through the selected grid is "50".

For example, when calculating the number of charging stands 122 suitable for the cafe 1132, the information management device 200 multiplies the number "50" of the vehicles 111 in one day, which pass through the designated grid and for which charging is required, by a popularity ratio "0.4", and estimates the number of vehicles 111 using the cafe 1132 to be "20". When "20" is to be allocated for each time period, a congestion degree "0.4" in a peak time period (in this example, a congestion degree in the cafe 1132 at the peak time is assumed to be 40%) is multiplied by "20", obtaining "8". That is, it is calculated that "8" vehicles 111 use the charging stand 122 at the peak time.

For example, when the charging stand 122 is newly introduced into the cafe 1132, the information management device 200 calculates "8" as the number of charging stands 122 suitable for the cafe 1132.

On the other hand, in a case where 2 charging stands 122 are already installed, when the charging stands 122 are fully operating at the peak time, a number "6" obtained by subtracting the number "2" of the installed charging stands 122 from "8" is calculated as the number of charging stands 122 suitable for the cafe 1132. For another example, when the number of vehicles 111 using 2 charging stand 122 in one day is actually "10", the information management device 200 corrects the number of the vehicles 111 using the cafe 1132 to be "10", and calculates the number of the charging stands 122 suitable for the cafe 1132 to be "4" by multiplying the congestion degree "0.4" in the peak time period by "10".

Similarly, the number of the charging stands 122 is calculated for the cafe 1133 to the cafe 1135.

The calculation method of calculating the number of the charging stands 122 suitable for the store is not limited to the contents described above.

For example, among the stores narrowed in step S1130, a closest store installed with the charging stands 122 may be identified, and the number of the charging stands 122 suitable for the store may be calculated based on the number of the charged vehicles using the charging stands 122 installed in the identified store. More specifically, the information management device 200 refers to the statistical information 227, acquires the number of the charging stand 122 used in one day in the identified store, and uses the acquired number to calculate the number of the charging stands 122 corresponding to the congestion of the narrowed stores at the peak time.

The information management device 200 may calculate an amount of increase in profits as information on adjustment of the calculated number of the charging stands 122. This calculation is performed, for example, after step S1140.

First, the information management device 200 uses the following Formula (1) to calculate the number of days (number of days for investment recovery) in which an initial investment amount can be recovered.

Number of days for investment recovery=initial investment amount/(revenue of increase in one day−cost of increase in one day) (1)

Here, the initial investment amount includes a unit price, a construction cost, and the like of the charging stand 122. The revenue of increase is revenue generated by installing the charging stand 122, and is, for example, a value obtained by multiplying the number of vehicles 111 using the charging stand 122 by an average customer unit price of the store. The cost of increase is a cost related to the installed charging stand 122, and is, for example, an electricity cost and a maintenance cost.

Next, the information management device 200 uses the following Formula (2) to calculate a month revenue of increase after the number of days for investment recovery has elapsed.

Month revenue of increase=(revenue of increase in one day−cost of increase in one day)×number of days of month×number of charging stand of increase (2)

Here, introducing the charging stand 122 costs a lot of money and a party (business operator 120) to install the charging stand 122 is hesitant to install the charging stand 122 since merits of installing the charging stand 122 are unknown. In this regard, as described above, by presenting the merits (for example, the month revenue of increase) of introducing the charging stand 122 to the business operator 120, the business operator 120 can be encouraged to install the charging stand 122. Accordingly, it is possible for the business operator 120 to avoid a situation in which a chance of the user 110 stopping at the store is lost.

Figure 12:
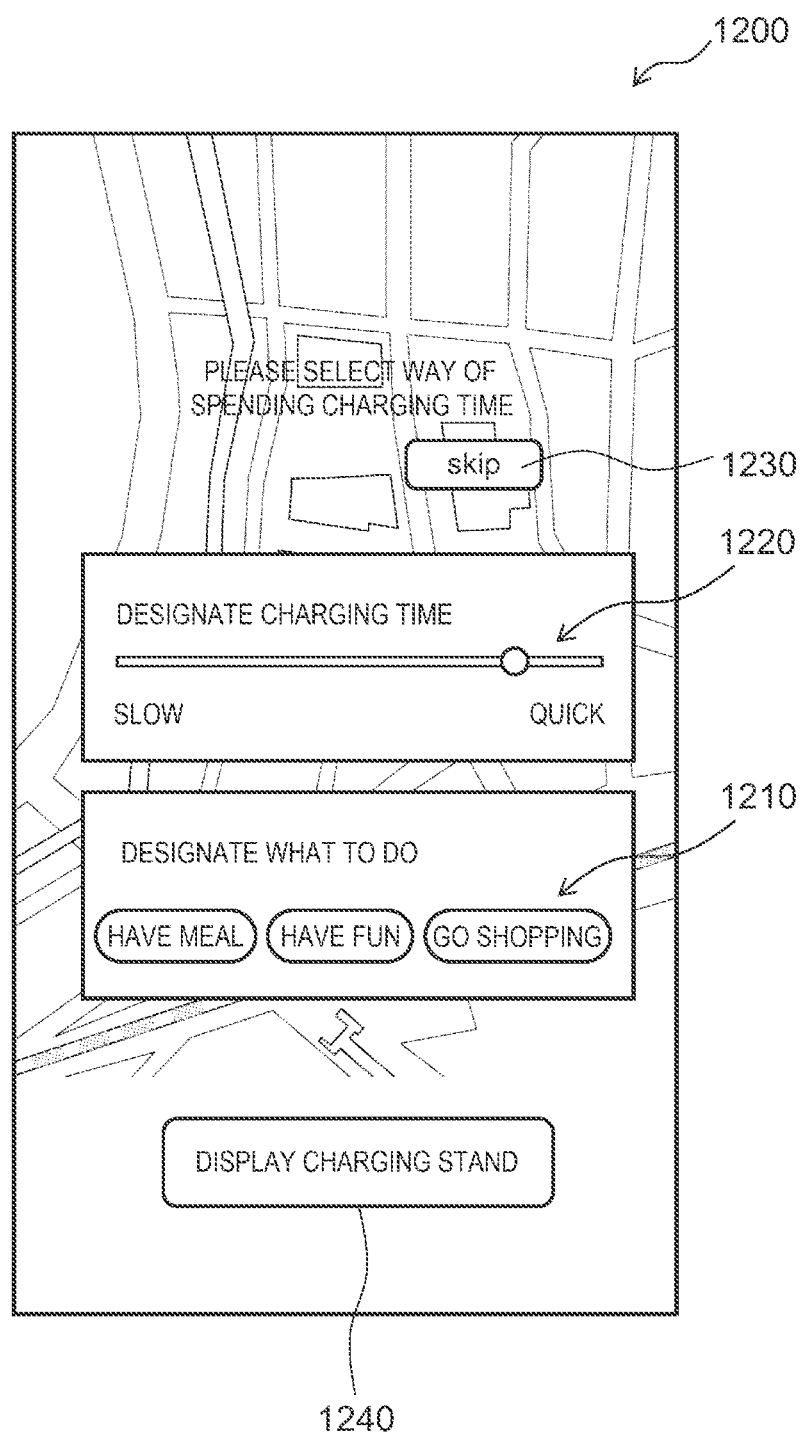
FIG. 12 is a diagram illustrating an example of a screen according to the first embodiment.

FIG. 12 is a diagram illustrating an example of a screen (input screen 1200) for inputting what the user 110 wants to do during the charging.

The input screen 1200 is a screen for designating how to spend the charging time. The input screen 1200 includes an input item 1210 for inputting what the user wants to do during the charging, an input item 1220 for designating a desired charging time, a skip button 1230 for skipping the input of the input item 1210 and the input item 1220, and a display button 1240 for confirming the input of the input item 1210 and the input item 1220 and for displaying the charging stand 122.

For example, the user 110 designates what the user wants to do during the charging by pressing an icon (in this example, "have meal", "have fun", and "go shopping") at the input item 1210. For another example, the charging time is designated by pressing a slider bar at the input item 1220. Further, when the designation is finished, the user 110 presses the display button 1240.

Figure 13:
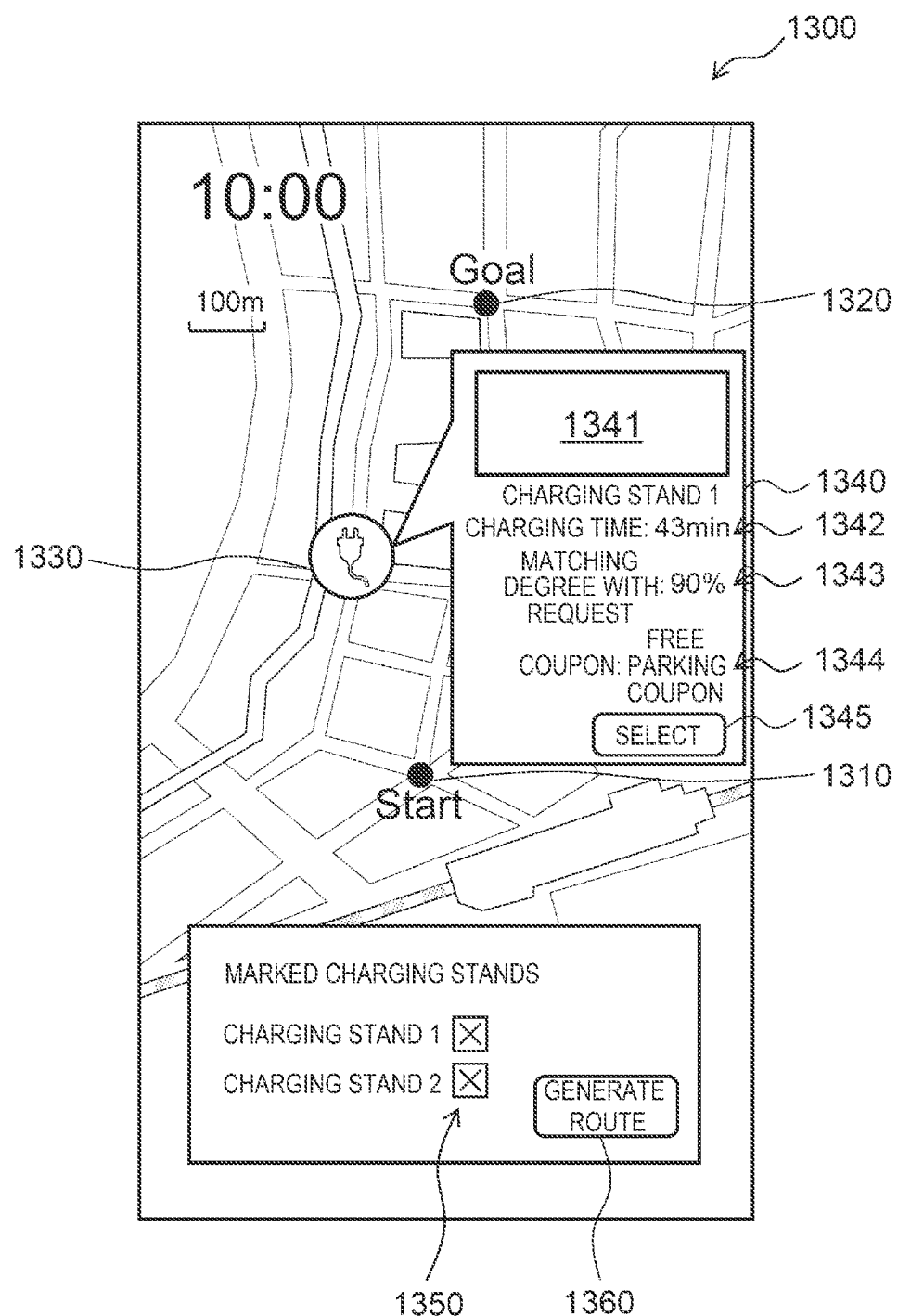
FIG. 13 is a diagram illustrating an example of a screen according to the first embodiment.

FIG. 13 is a diagram illustrating an example of a screen (selection screen 1300) for inputting (selecting) the charging stand 122 at which the user 110 wants to stop.

The selection screen 1300 is a screen for the user 110 to select the charging stand 122 (a screen for marking the charging stand 122 at which the user wants to stop). The selection screen 1300 includes a departure location icon 1310 indicating a departure location, a destination icon 1320 indicating a destination, a charging stand icon 1330 indicating one or more charging stands 122, a display region 1340 for displaying information on the charging stand 122, an input item 1350 for displaying the selected charging stand 122 at which the user wants to stop, and a route generation button 1360 for instructing generation of a route passing through the selected charging stand 122.

For example, the user 110 presses the charging stand icon 1330 so that the display region 1340 is displayed. In the display region 1340, an image 1341 of the charging stand 122, a charging time 1342 at the charging stand 122, a degree 1343 (degree matching a request) of matching contents input at the input screen 1200, and a content 1344 of a distributed coupon, all of which are taken as the information on the charging stand 122, and a selection button 1345 for selecting the displayed charging stand 122 are displayed. When preferring the displayed and confirmed charging stand 122, the user 110 marks the charging stand 122 by pressing the selection button 1345. Accordingly, at the input item 1350, the marked charging stand is displayed. In order to change the selection of the charging stand 122, a mark corresponding to deletion ("x") may be displayed. Further, when finishing the selection of the charging stand 122, the user 110 presses a route generation button 1360. Although operations of the user 110 inputting the charging stand 122 at which the user 110 wants to stop by pressing the screen are described as an example in the present embodiment, the input method is not limited thereto, and the input may be performed by voice recognition.

Figure 14:
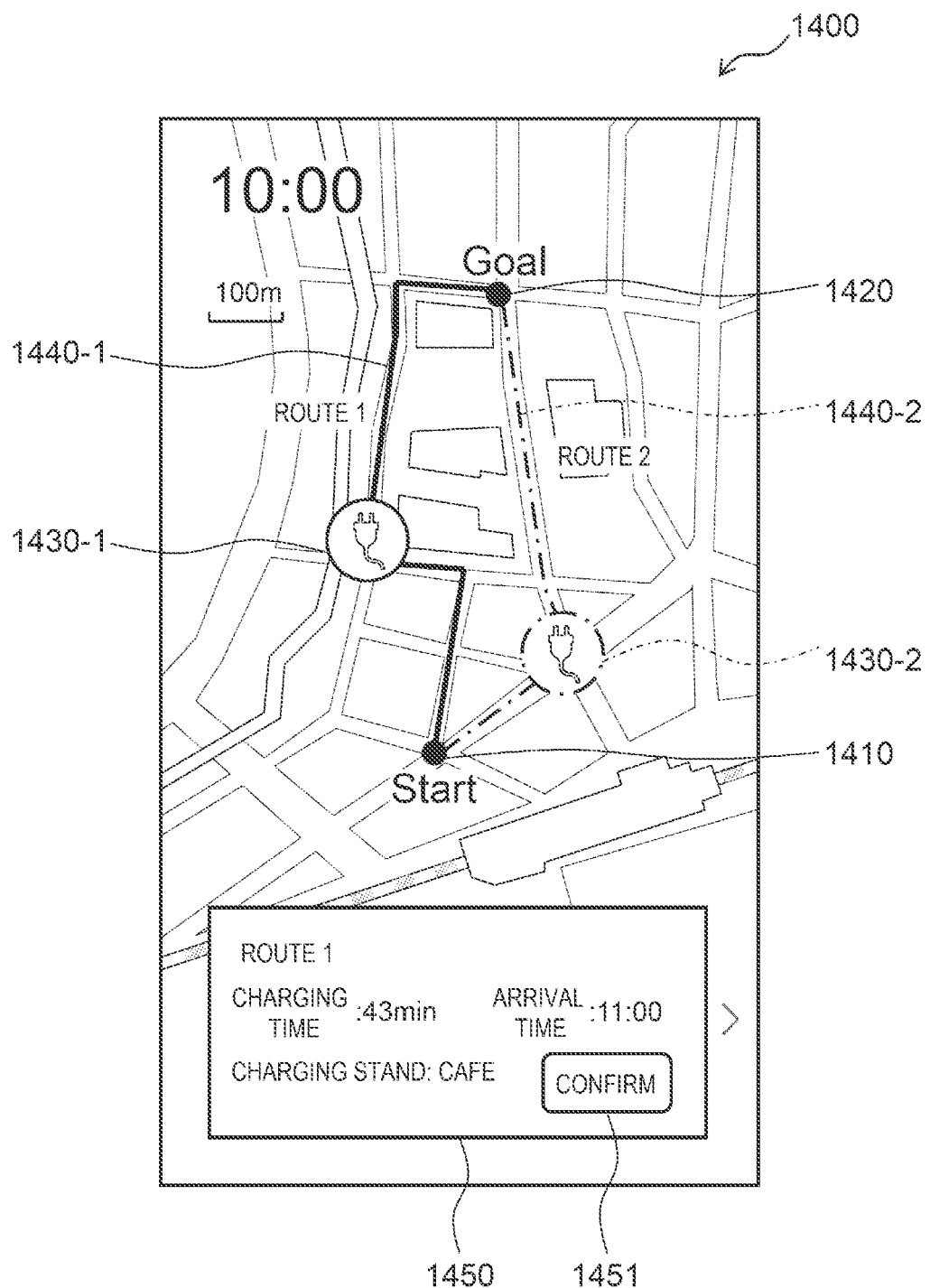
FIG. 14 is a diagram illustrating an example of a screen according to the first embodiment.

FIG. 14 is a diagram illustrating an example of a screen (route selection screen 1400) for the user 110 to select a route.

The route selection screen 1400 is a screen for the user 110 to select a route. The route selection screen 1400 includes a departure location icon 1410 indicating a departure location, a destination icon 1420 indicating a destination, a charging stand icon 1430 indicating one or more charging stands 122, a route display 1440 indicating one or more routes, and a display region 1450 for displaying information on the selected route.

For example, the user 110 presses the charging stand icon 1430 or the route display 1440 for confirmation so that the display region 1450 is displayed. In the display region 1450, information on the charging time at the charging stand 122, on the scheduled arrival time of arriving at the charging stand 122, and on a type of a store used during charging at the charging stand 122, which is taken as information on the route, and a confirmation button 1451 for selecting (confirming) the route are displayed. When the user 110 determines that there is no problem about the displayed and confirmed route and the charging stand 122, the user 110 presses the confirmation button 1451.

According to the present embodiment, the user can charge the vehicle with the charging stand according to personal preference and purpose, and thus can effectively utilize the time during the charging. In addition, the business operator can introduce the charging stand after confirming the merits of installing the charging stand, and can avoid a situation in which a chance of the user stopping at the store is lost.

(2) Other Embodiments

Although a case where the invention is applied to an information management system is described in the embodiment described above, the invention is not limited thereto, and can be widely applied to various other systems, devices, methods, and programs.

Further, in the embodiment described above, for example, step S904 may be performed as the following processing. For example, the information management device 200 identifies a current location (departure location) based on probe information according to a vehicle ID, and searches for a route from the departure location to a destination based on map information, departure location, and the destination. More specifically, the information management device 200 identifies the current location (departure location) based on the probe information according to the vehicle ID, refers to store information, and selects a store that is in a circle whose diameter is a straight line connecting the departure location and the destination and that satisfies what the user wants to do during charging (a store matching the store type). A store that is within a predetermined distance from the destination and that satisfies what the user wants to do during the charging may be selected without acquiring the departure location.

For another example, step S905 may be performed as the following processing. For example, the information management device 200 refers to the store information, extracts stores along the route (stores within a predetermined distance from the route), and selects, from the extracted stores, a store satisfying what the user wants to do during charging (a store matching the store type). Further, when a plurality of stores are selected, the information management device 200 sorts the stores in an order of popularity (for example, in a descending order of the number of stopping). The information management device 200 transmits the charging stand ID of the picked-up recommended charging stand 122 together with the map and the route to the user operation terminal 112.

Although a case where the information management device 200 determines in step S1002 whether the scheduled arrival time is later than the predetermined time is described in the embodiment described above, the invention is not limited thereto, and the information management device 200 may determine whether retardation is detected, or may determine whether the charging stand 122 as a stopping location is closed. That is, the information management device 200 determines whether a changed situation is detected.

Although a case where the user uses screens to input various types of information (on what the user wants to do) is described in the embodiment described above, the invention is not limited thereto, and various types of information may be input using voices (microphone).

In the embodiment described above, the "communication device" may be one or more interfaces. The one or more interfaces may be one or more types of communication interface devices (for example, one or more network interface cards (NIC)), or two or more heterogeneous communication interface devices (for example, NIC and host bus adapter (HBA)).

Further, in the embodiment described above, the "storage device" is at least one of a memory unit (typically, at least the memory unit) and at least a part of a PDEV unit.

Further, in the embodiment described above, the "memory unit" is one or more memories, and typically may be a main storage device. At least one memory in the memory unit may be a volatile memory or a nonvolatile memory.

In the embodiment described above, a "PDEV unit" is one or more PDEVs, and typically may be an auxiliary storage device. The "PDEV" refers to a physical storage device, and is typically a nonvolatile storage device, such as a hard disk drive (HDD) or a solid state drive (SSD).

Further, in the embodiment described above, the "control device" is one or more processors. At least one processor is typically a microprocessor such as a central processing unit (CPU), and may be another type of processor such as a graphics processing unit (GPU). At least one processor may be a single core or a multi-core processor. At least one processor may be a processor in a broad sense such as a hardware circuit (for example, a field-programmable gate array (FPGA) or an application specific integrated circuit (ASIC)) that performs a part or all of the processings.

Further, although the processing may be described using a "program" as a subject in the embodiment described above, since the program performs the defined processing by being executed by the control device while using a storage unit (for example, a memory) and/or an interface unit (for example, a communication port) as appropriate, the subject of the processing may be a processor. The processing described using the program as a subject may be a processing performed by a control device or a device including the control device. Further, the control device may include a hardware circuit (for example, a field-programmable gate array (FPGA) or an application specific integrated circuit (ASIC)) that performs a part or all of the processings. The program may be installed from a program source into a device such as a computer. The program source may be, for example, a recording medium (for example, a non-transitory recording medium) readable by a program distribution server or a computer. In the following description, two or more programs may be implemented as one program, or one program may be implemented as two or more programs.

Further, in the embodiment described above, the configuration of each table is an example, and one table may be divided into two or more tables, or all or a part of the two or more tables may be one table.

In the above description, information on a program, a table, and a file for implementing functions can be stored in a storage device such as a memory, a hard disk, or a solid state drive (SSD), or can be stored in a recording medium such as an IC card, an SD card, or a DVD.

The invention has, for example, the following characteristic configurations.

A configuration is provided which includes: a first acquisition unit (for example, the first acquisition unit 201) that acquires, from a probe information management device (for example, the probe information management device 130) that stores location information indicating a location of a vehicle (for example, the vehicle 111) and battery residual capacity information indicating a battery residual capacity of a battery provided in the vehicle, the location information of the vehicle and the battery residual information of the vehicle; a second acquisition unit (for example, the second acquisition unit 202) that acquires, from a user operation terminal (for example, the user operation terminal 112) operated by a user (for example, the user 110) who gets on the vehicle, destination information indicating a location of a destination of the vehicle input by the user (for example, location information, or information that makes it possible to identify a location, such as an address, a telephone number or coordinates on a map) and information on what the user wants to do during charging of the vehicle (for example, information input freely by the user such as "I want to relax" and "I want to having a meal", or type information indicating a type of a store associated with the former information); and a storage unit (for example, the storage unit 203) that stores the location information of the vehicle and the battery residual capacity information of the vehicle in association with the destination information of the vehicle and the information on what the user wants to do during the charging.

According to the configuration described above, the location information of the vehicle and the battery residual capacity information of the vehicle are associated with the destination information of the vehicle and the information on what the user wants to do during the charging. Therefore, a store satisfying what the user wants to do during the charging can be proposed, for example, when the user moves from a current location toward the destination and charging is required in a case of determining whether charging by a charging stand is required. With this proposal, the user can effectively utilize the time during the charging.

A determination unit (for example, the determination unit 206) is provided that determines whether a scheduled time of arriving at the destination of the vehicle is later than a predetermined time, the first acquisition unit acquires latest location information of the vehicle and latest battery residual capacity information of the vehicle from the probe information management device when the determination unit determines that the scheduled time is later than the predetermined time, and the storage unit stores the latest location information of the vehicle and the latest battery residual capacity information of the vehicle in association with the destination information of the vehicle and the information on what the user wants to do during the charging.

According to the configuration described above, the latest location information of the vehicle and the latest battery residual capacity information of the vehicle are associated with the destination information of the vehicle, and the information what the user wants to do during the charging. Therefore, a store satisfying what the user wants to do during the charging can be proposed according to, for example, a current situation. With this re-proposal, even when the situation is changed due to retardation or the like, a chance for the user to effectively utilize the time during the charging can be ensured.

The storage unit stores statistical information (for example, the statistical information 227) indicating the number of vehicles related to the store, and a calculation unit (for example, the calculation unit 207) is provided that calculates the number of charging stands suitable for a predetermined store based on the statistical information stored in the storage unit.

According to the configuration described above, for example, since a business operator can grasp the number of charging stands suitable for the store, the introduction of the charging stand suitable for the store can be proposed to the business operator. Since the business operator introduces the charging stand and the number of the charging stands installed increases, a chance for the user to use a desired store increases, and thus a chance for the user to effectively utilize the time during the charging can be increased.

The storage unit stores congestion information (for example, a congestion degree included in the store information 222) indicating a congestion degree of a store in a plurality of time periods, and the calculation unit, for the predetermined store and based on the congestion information and the statistical information, allocates the number of vehicles related to the predetermined store according to a congestion degree of the predetermined store and calculates the number of vehicles allocated at a peak time as the number of charging stands suitable for the predetermined store.

According to the configuration described above, for example, since the number of charging stands suitable for the store can be calculated more accurately by taking the congestion degree of the store into consideration, the business operator can more appropriately advance the introduction of the charging stand.

The storage unit stores, as the statistical information, information obtained by counting the number of vehicles passing through a predetermined region and having a battery residual capacity less than or equal to a predetermined value, and the calculation unit allocates the number of vehicles passing through the predetermined region to stores present in the predetermined region according to popularity of the stores, further allocates, for a predetermined store among the stores, the number of vehicles allocated to the predetermined store according to a congestion degree of the predetermined store, and calculates the number of vehicles allocated at a peak time as the number of charging stands suitable for the predetermined store (for example, see FIG. 11).

According to the configuration described above, for example, since the number of charging stands suitable for the store can be calculated more accurately by taking the number of vehicles requiring charging into consideration, the business operator can more appropriately advance the introduction of the charging stand.

The storage unit stores, as the statistical information, information obtained by counting a number indicating the number of vehicles having used the charging stands installed in the stores, and the calculation unit identifies the number of both the predetermined store and a store that matches the type of the store and that is closest to the predetermined store in distance, allocates the identified number according to a congestion degree of the predetermined store to the predetermined store, and calculates the number of vehicles allocated at the peak time as the number of charging stands suitable for the store.

A selection unit (for example, the selection unit 204) is provided that selects a store satisfying what the user wants to do during the charging, based on the destination information of the vehicle and the information on what the user wants to do during the charging stored by the storage unit, and transmits information on the selected store to the user operation terminal.

According to the configuration described above, for example, since the user can grasp the store satisfying what the user wants to do during the charging, the user can stop at a preferred store and effectively utilize the time during the charging.

The selection unit, based on the store information (for example, the store information 222) including both location information indicating the location of the store and type information indicating a type of the store, selects a store that is within a travelable range calculated based on the location information of the vehicle and the battery residual capacity information of the vehicle and that satisfies what the user wants to do during the charging, and transmits information on the selected store to the user operation terminal.

According to the configuration described above, for example, since the user can grasp the store satisfying what the user wants to do during the charging among reachable stores without charging when the user moves from the current location to the destination, the user can stop at a preferred store and effectively utilize the time during the charging.

A generation unit (for example, the generation unit 205) is provided that generates a route, using a location of the vehicle in the location information as a departure location, a location of the vehicle in the destination information as a destination, and a location of a store designated by the user as a stopping location, and the selection unit transmits information on the route generated by the generation unit to the user operation terminal.

According to the configuration described above, for example, the user can select a charging stand (store) to be used, including a route of the current location, the store, and the destination.

The selection unit transmits information (for example, a content of a coupon) on a coupon available in the selected store to the user operation terminal.

According to the configuration described above, the user can select a charging stand (store) to be used, including the content of the coupon available in the store.

When the scheduled time at which the vehicle arrives at the destination is later than the predetermined time, the selection unit selects a store that is within a travelable range calculated based on the latest location information of the vehicle and the latest battery residual capacity information of the vehicle and that satisfies what the user wants to do during the charging, and transmits information on the selected store to the user operation terminal (for example, see FIG. 10).

According to the configuration described above, since a store matching the current situation is presented to the user based on the latest location information and the latest battery residual capacity information even when the situation is changed due to retardation or the like, the user can effectively utilize the time during the charging without worrying about being later than the arrival time.

The storage unit stores type information (for example, information on store type included in the store information 222) indicating a type of the store used by the user, and when the information on what the user wants to do during the charging is not input, the selection unit selects a store by using type information of a most-frequently-used store as the information on what the user wants to do during the charging, based on the type information of the store used by the user which is stored by the storage unit (for example, see FIG. 10).

According to the configuration described above, since a store satisfying the preference of the user is presented based on a history of the user stopping at the store, for example, the user can effectively utilize the time during the charging in the store satisfying the preference thereof.

The storage unit stores stopping store information (for example, stopping store information included in the history information 226) indicating a store used by the user, and the selection unit selects a predetermined number of high-ranking stores used by many users based on the stopping store information stored by the storage unit (for example, see step S905 in FIG. 9).

According to the configuration described above, since a popular store is presented based on a history of another user stopping at the store, for example, the user can effectively utilize the time during the charging in the popular store.

In addition, the configuration described above may be modified, rearranged, combined, or omitted as appropriate without departing from the scope of the invention.

What is claimed is:

1. An information management system comprising:
a first acquisition unit that acquires, from a probe information management device that stores location information indicating a location of a vehicle and battery residual capacity information indicating a battery residual capacity of a battery provided in the vehicle, the location information of the vehicle and the battery residual capacity of the vehicle;
a second acquisition unit that acquires, from a navigation system, destination information indicating a location of a destination of the vehicle input by a user and acquires information indicating what the user wants to do during charging of the vehicle by receiving a selection from the user of one of a plurality of selections;
a storage unit that stores the location information of the vehicle and the battery residual capacity information of the vehicle in association with the destination information of the vehicle and the information indicating what the user wants to do during the charging; and
a calculation unit,
wherein the storage unit stores statistical information indicating the number of vehicles to stop at a store at each of a plurality of times per day,
wherein the calculation unit calculates the number of charging stands suitable for a predetermined store based on the statistical information stored by the storage unit,
wherein the storage unit stores congestion information indicating a congestion degree for the store for each hour of each day, the congestion degree being a ratio of a number of users per hour to a total number of users per day, and
wherein the calculation unit, for the predetermined store and based on the congestion information and the statistical information, allocates the number of vehicles to stop at the store according to the congestion degree of the predetermined store and calculates the number of vehicles allocated at a peak time of the store as the number of charging stands suitable for the predetermined store.

2. The information management system according to claim 1, further comprising:
a determination unit that receives a route search request, and determines whether a scheduled time of arriving at the destination of the vehicle is later than a predetermined time of the destination, wherein
the first acquisition unit acquires latest location information of the vehicle and a latest battery residual capacity of the vehicle from the probe information management device when the determination unit determines that the scheduled time is later than the predetermined time, and
the storage unit stores the latest location information of the vehicle and the latest battery residual capacity information of the vehicle in association with the destination information of the vehicle and the information on what the user wants to do during the charging.

3. The information management system according to claim 1, wherein
the storage unit stores, as the statistical information, information obtained by counting the number of vehicles passing through a predetermined region and having a battery residual capacity less than or equal to a predetermined value, and
the calculation unit allocates the number of vehicles passing through the predetermined region to stores present in the predetermined region according to popularity of the stores, further allocates, for a predetermined store among the stores, the number of vehicles allocated to the predetermined store according to a congestion degree of the predetermined store, and calculates the number of vehicles allocated at a peak time as the number of charging stands suitable for the predetermined store.

4. The information management system according to claim 1, further comprising:
a selection unit that selects a store satisfying what the user wants to do during the charging, based on the destination information of the vehicle and the information on what the user wants to do during the charging stored by the storage unit, and transmits information on the selected store to the user operation terminal.

5. The information management system according to claim 4, wherein
the selection unit, based on store information including both location information indicating a location of a store and type information indicating a type of the store, selects a store that is within a travelable range calculated based on the location information of the vehicle and the battery residual capacity information of the vehicle, and that satisfies what the user wants to do during the charging, and transmits information on the selected store to the user operation terminal.

6. The information management system according to claim 4, further comprising:
a generation unit that generates a route, using a location in the location information of the vehicle as a departure location, a location in the destination information of the vehicle as a destination, and a location of a store designated by the user, among the stores selected by the selection unit, as a stopping location, wherein
the selection unit transmits information on the route generated by the generation unit to the user operation terminal.

7. The information management system according to claim 4, wherein
the selection unit transmits information on a coupon available in the selected store to the user operation terminal.

8. The information management system according to claim 4, wherein
when a scheduled time at which the vehicle arrives at the destination is later than a predetermined time, the selection unit selects a store that is within a travelable range calculated based on latest location information of the vehicle and latest battery residual capacity information of the vehicle, and that satisfies what the user wants to do during the charging, and transmits information on the selected store to the user operation terminal.

9. The information management system according to claim 4, wherein
the storage unit stores type information indicating a type of a store used by the user, and
when the information on what the user wants to do during the charging is not input, the selection unit selects a store by using type information of a most-frequently-used store as the information on what the user wants to do during the charging, based on the type information of the store used by the user and stored by the storage unit.

10. The information management system according to claim 4, wherein
the storage unit stores stopping store information indicating a store used by the user, and
the selection unit selects a predetermined number of high-ranking stores used by many users based on the stopping store information stored by the storage unit.

11. An information management method, comprising:
acquiring, from a probe information management device that stores location information indicating a location of a vehicle and battery residual capacity information indicating a battery residual capacity of a battery provided in the vehicle, the location information of the vehicle and the battery residual capacity of the vehicle;
acquiring, from a navigation system, destination information indicating a location of a destination of the vehicle input by a user and acquires information indicating what the user wants to do during charging of the vehicle by receiving a selection from the user of one of a plurality of selections;
storing the location information of the vehicle and the battery residual capacity information of the vehicle in association with the destination information of the vehicle and the information indicating what the user wants to do during the charging;
storing statistical information indicating the number of vehicles to stop at a store at each of a plurality of times per day;
calculating the number of charging stands suitable for a predetermined store based on the statistical information stored by the storage unit;
storing congestion information indicating a congestion degree for the store for each hour of each day, the congestion degree being a ratio of a number of users per hour to a total number of users per day; and
for the predetermined store and based on the congestion information and the statistical information, allocating the number of vehicles to stop at the store according to the congestion degree of the predetermined store and calculating the number of vehicles allocated at a peak time of the store as the number of charging stands suitable for the predetermined store.

* * * * *